United States Patent [19]

Roen

[11] 4,401,878

[45] Aug. 30, 1983

[54] CONSUMABLE ARC WELDING TORCH

[75] Inventor: Richard A. Roen, Denver, Colo.

[73] Assignee: RSR Systems, Inc., Englewood, Colo.

[21] Appl. No.: 248,844

[22] Filed: Mar. 30, 1981

[51] Int. Cl.³ .............................................. B23K 9/00
[52] U.S. Cl. ......................... 219/137.31; 219/125.11; 219/125.12
[58] Field of Search ........... 219/125.1, 125.11, 125.12, 219/137.31

[56] References Cited

U.S. PATENT DOCUMENTS

| 2,163,657 | 6/1939 | Beckman | 219/125.12 |
| 3,681,564 | 8/1972 | Hiyama | 219/125.12 |
| 4,072,828 | 2/1978 | Thome | 219/137.31 |
| 4,177,373 | 12/1979 | Roen | 219/125.12 |

FOREIGN PATENT DOCUMENTS

| 53-102850 | 9/1978 | Japan | 219/125.12 |
| 53-106361 | 9/1978 | Japan | 219/125.12 |
| 55-126373 | 9/1980 | Japan | 219/125.12 |

Primary Examiner—Elliot A. Goldberg
Attorney, Agent, or Firm—Cantor and Lessler

[57] ABSTRACT

An arc welding apparatus that imparts a rotational movement to the tip of the consumable electrode to cause drops of molten metal to be thrown by centrifugal force against the sidewall of the slot between the two metal workpieces being welded.

7 Claims, 17 Drawing Figures

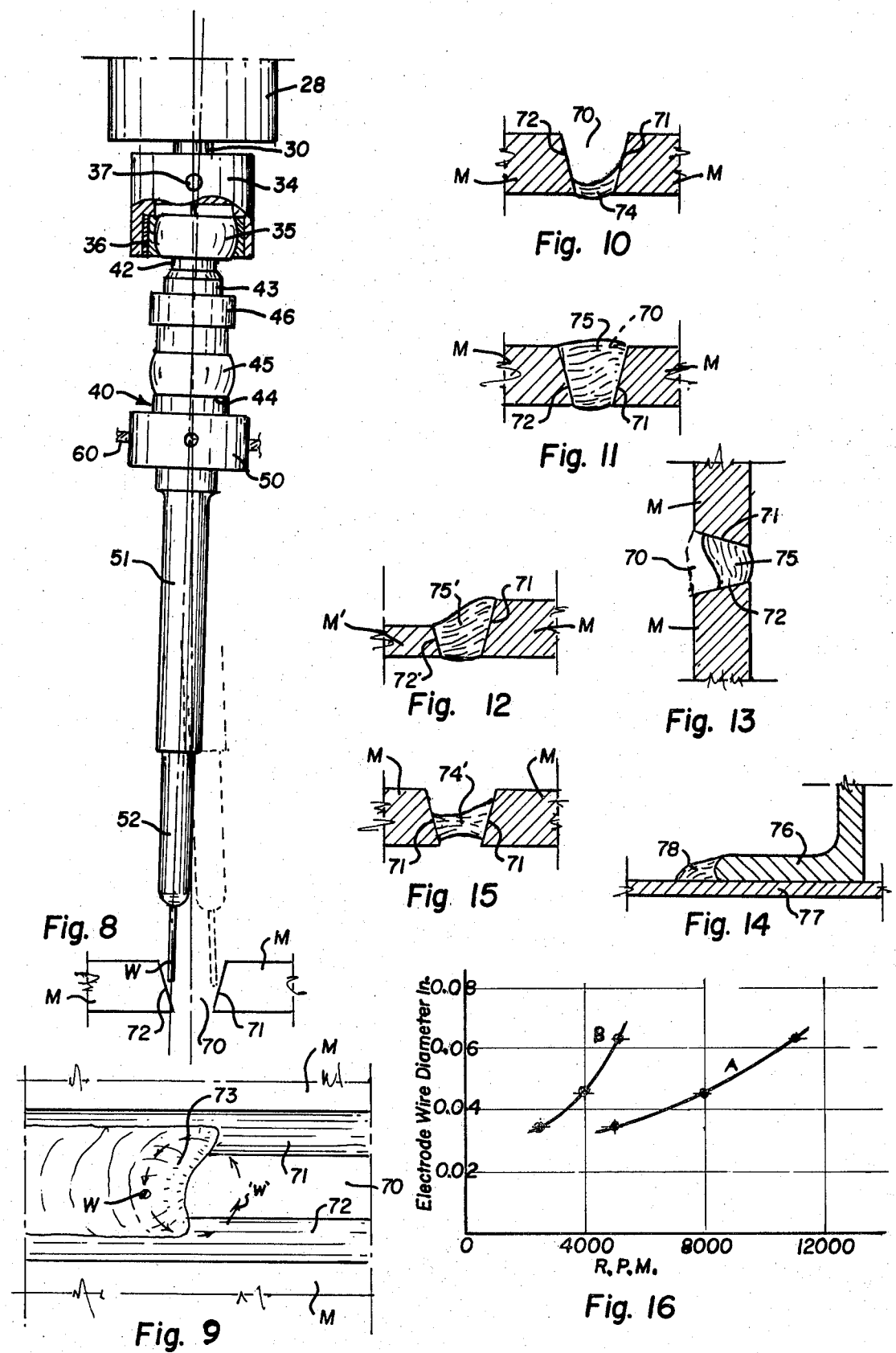

CONSUMABLE ARC WELDING TORCH

BACKGROUND OF THE INVENTION

The present invention relates to arc welding which uses a continuous feed of a consumable wire electrode and more particularly to such continuous arc welding where lateral movement is imparted to the arcing end of the electrode.

Continuous arc welding as above defined has been used for a long time, especially in connection with automatic welding processes. Specified welding processes are first defined as to the manner in which the arcing electrode is protected from oxidation. A popular process is known as gas metal arc (GMA) where the arc is protected by an inert gas. In another process, submerged arc welding, the arc is submerged in a flux puddle. The flux may be applied by a separate mechanism or provided by using a flux core electrode wire. The use of selected gases and blends of gases and selected fluxes is a highly developed art and it is possible to obtain good welds with practically any type of metal or alloy of metals.

Once the gas or flux is selected, the problems encountered in a welding operation lie in the preparation of the joint or slot between the pieces to be welded together, the selection of wire size, the amount of current to be applied and, in an automatic operation, the rate of wire movement into the slot and the rate of movement of the torch along the slot. Also, there must be a determination as to whether a single pass or several passes are best for the job. These, and other considerations make continuous arc welding more of an art than a science and set-up problems are often encountered especially with automatic equipment. The variables not only have to be established at the beginning of a welding operation but also have to be adjusted during the welding, as for example, when the width of the slot changes. A number of refinements have been developed in welding equipment to overcome the problems encountered, especially in automatic equipment. There is, nevertheless, room for further improvement and one area of improvement relates to the manner in which metal is transferred from the electrode to the walls of the slot.

My U.S. Pat. No. 4,177,373, dated Dec. 4, 1979, entitled "Oscillation Arc Welding" discloses a significant improvement in metal transfer from the electrode to the walls of the slot. The consumable electrode is oscillated in the slot between the two pieces being welded together, with the further feature of producing a sudden stop or impact at each end of the oscillation path. This impact impels drops of molten metal from the electrode to the sides of the slot. This oscillation movement impelling drops of metal against the slot walls as fast as they form provides for a significant improvement in many welding operations over conventional procedures where drops of metal are dispersed in a more random manner by the action of gravity and the arcing current known as the Lorenz effect.

SUMMARY OF THE INVENTION

The present invention extends the state of the art beyond the process disclosed in my U.S. Pat. No. 4,177,373. As in that process drops of molten metal are impelled from the electrode to the side walls of the slot to build up a puddle of molten metal in the slot. However, the movement of the electrode is in a circular path with drops of molten metal being thrown by centrifugal force. This movement of the arc end of the electrode will be hereinafter called "rotation" although it is to be understood that the electrode wire does not rotate but, rather, revolves about an axis.

The welding action which occurs as a result of this rotation of the arc end of the electrode, though easily observed, is not clearly understood. The improvements in control, quality and welding rate were surprising and unexpected. Logically, it would seem that the circular movement or rotation of the electrode would not make a good weld, because a substantial amount of metal would be thrown away from the weld puddle to be wasted and cause poor coalescence. This had been demonstrated with the apparatus of the U.S. Pat. No. 4,177,373. When operated with the direction of oscillation normal to, or across, the slot a good weld was obtained. When the direction of oscillation was angled with respect to the slot a poor weld was obtained and when the direction of oscillation was parallel to the slot no weld or an unsatisfactory weld resulted. However, welding while rotating the electrode is not similar to the oscillation action.

An apparatus to produce the circular movement of the electrode wire may be a modified conventional torch. In a conventional torch the electrode wire extends a short distance below a contact tip at the base of the torch through which the wire passes. To move the arcing end of the wire in a circular path the contact tip is carried on a wand which is articulated for circular movement, or rotation, by a motor within the torch. In operation, the wire may also flex somewhat due to centrifugal action.

In observing the welding action at various rates of rotation of the electrode it was noted that there were critical maximum and minimum rotation rates. At higher rates of rotation, the molten metal was ejected in all directions as fine droplets which would not always coalesce. At lower rates of rotation, the welding action was not significantly different from conventional welding operations. However, at rotation rates between the critical limits there was no ejection of metal drops forwardly of the puddle but there was increased deposition against the sidewall of the slot which was being approached by the electrode as it moved across the slot at the forward side of the puddle. Deposition of metal continued however, as the electrode moved past that sidewall and over the puddle and to the other sidewall of the slot. The weld metal was directed primarily against the sidewalls of the weld slot and would form a root pass with a concave bead which was ideal for subsequent filling passes. The increased deposition of metal against one sidewall was not excessive or undesirable.

Actually, the increased deposition of metal at one sidewall is an exceptional improvement for welds in horizontal slots between vertical plates. By providing an excess of metal at the upper plate a more uniform weld is possible. Another improvement resides in welding plates of differing thickness with the increased deposition of metal being at the thicker plate.

A desirable result attainable with this welding process resides in the discovery that a welding operation could proceed faster than possible with a comparable conventional apparatus apparently because rotation of the electrode stabilizes the arc so that its action is continuous. The electric current, the wire feed rate and the torch movement rate may be increased once the welding operation is commenced.

From the foregoing the primary objects of the invention are manifest and these and other objects of the invention are to provide a novel and improved process for welding which: produces a better weld; is less sensitive to the need for precise tracking in the weld joint slot; may reduce the welding time; can effectively weld plates in a vertical position and plates of different thickness; and is versatile and reliable.

Also, other objects of the invention are to provide a novel and improved welding torch for continuous welding which: can effectively carry out the improved process; is easily adapted for use with conventional apparatus; may be used for machine or manual welding; and is a simple, economical, reliable, rugged and durable unit.

BRIEF DESCRIPTION OF THE DRAWINGS

With the foregoing and other objects in view, all of which more fully hereinafter appear, my invention comprises certain combinations, constructions and arrangements of parts and elements, and operations, sequences and steps, all as hereinafter described, defined in the appended claims and illustrated in preferred embodiment in the accompanying drawings in which:

FIG. 8 is an elevational view of certain operative components within the torch and showing in a somewhat exaggerated manner the movement of a wand carrying the electrode wire.

FIG. 9 is a plan view showing a welding operation to join two pieces of metal together with arrows indicating the path of the electrode wire above the puddle.

FIGS. 10, 11, 12, 13, 14 and 15 show sections of metal plates being joined together by welds according to the present invention.

FIG. 16 is a diagram to show the relationship of electrode wire diameter to the rate of rotation of the electrode wire.

DETAILED DESCRIPTION OF THE PREFERRED EMBODIMENT

Figure 1:
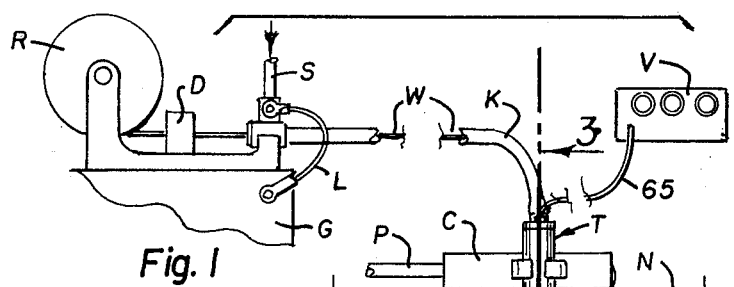
FIG. 1 is a diagrammatic elevational view of the components of a mechanized continuous arc welding apparatus incorporating therein the improved torch.
Figure 2:
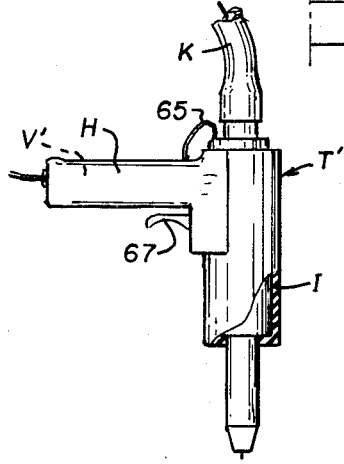
FIG. 2 is a diagrammatic elevational view of the torch shown at FIG. 1 but on an enlarged scale and arranged for manual use.
Figure 4:
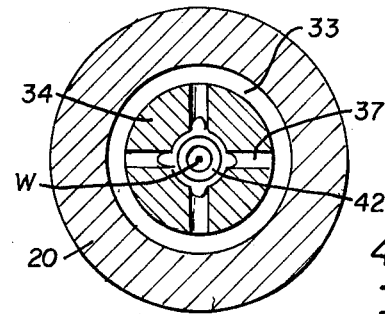
FIG. 4 is a transverse sectional view as taken from the indicated line 4—4 at FIG. 3.

Refe rring more particularly to the drawings, the improved torch T or T' is used in a conventional manner and with conventional equipment. FIG. 1 shows the torch T mounted upon a carriage C for mechanized welding. FIG. 2 shows the torch T' adapted for manual welding. In either arrangement, a flexible, multipurpose, tubular carrier conduit K is attached to the head of the torch and an electrode wire W, an electric current and shielding gas all pass through the conduit K for the welding operation at the torch. The electric current is supplied by a generator G with a lead L connecting to the head of the conduit K. The electrode wire W on a supply reel R is fed into the conduit K by a wire drive D. Shielding gas, of any suitable type, will flow from a source, not shown, through a supply line S and to the head of the conduit K. As shown at FIG. 1. the carriage C is mounted upon a track N to be driven at a selected rate by a drive mechanism such as a plunger P. Metal plates M which are to be welded together are positioned alongside the track N and below the torch T. The manual unit shown at FIG. 2 is provided with a handle H and is preferably encased in an insulator I to avoid accidental shorting when in use.

Various controls are associated with this welding apparatus to regulate the electrical current, the rate of wire movement through the torch, the flow of shielding gas and the rate of movement of the carriage C along the track N. Such controls are conventional and are conventionally used in the present invention and need not be further described. It is to be noted, however, that a variable speed control V is necessary for regulating the speed of rotation of the electrode wire as will hereinafter appear.

The improved torch T includes a cylindrical, tubular body 20 wherein the several components which guide and rotate the electrode wire and form the gas passageway are located. The head of the torch is closed by a circular end 21, held in place by screws 22. The end 21 includes a cylindrical, axially-centered stub 23 extending above and below the end. A socket 24 open at the top of the stub 23 receives the terminal connector jack 25 of the conduit K. The jack 25 connects the torch with the electrical power source and also includes a central passageway 26 through which the electrode wire W passes and through which the shielding gas flows. An O-ring 27 on the jack prevents the leakage of gas.

Figure 5:
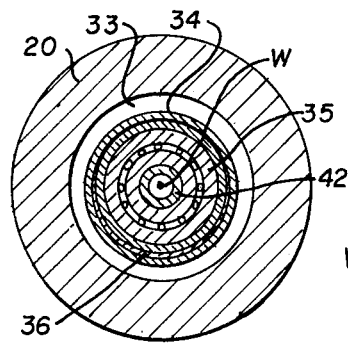
FIG. 5 is a transverse sectional view as taken from the indicated line 5—5 at FIG. 3.
Figure 5A:
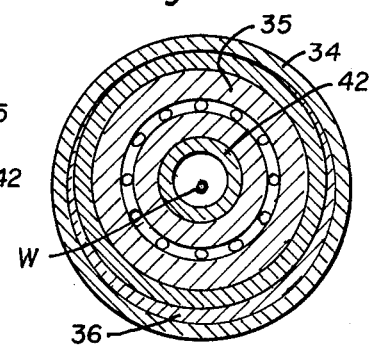
FIG. 5a is a center portion of FIG. 5 on an enlarged scale and with the components slightly exaggerated to better illustrate an eccentrically mounted bearing.

A cylindrical, variable-speed electrical motor 28 is tightly mounted in a socket 29 in the upper portion of the body and adjacent to the bottom of the cap stub 23. A tubular motor shaft 30 projects from both ends of this motor 28. The upper end of the shaft 30 fits into an axially centered hole 31 in the bottom of the stub 23 with the passageway 32 through the shaft 30 being in alignment with the jack passageway 26 to receive the electrode wire W and the flow of shielding gas. The lower end of the shaft 30 projects into a cavity 33 in the center portion of the body 20 and connects with and carries a rotor head 34 within this cavity. The lower portion of the rotor head 34, below the shaft 30, carries a spherical bearing 35 which is held in an eccentric position by a shim 36 as best shown at FIG. 5a. The rotor also includes radial gas vents 37 between the lower end of the shaft and the spherical bearing 35, which permit the gas to flow from the shaft passageway 32 and into the cavity 33.

The circular movement at the arc end of the electrode wire W, also called "rotation", is generated by a wand 40 having an axial passageway 41 through which the electrode wire W passes. This wand 40 is mounted in the lower portion of the body 20, below the rotor head 34 and its upper end, a tubular tip 42 fits into the eccentric spherical bearing 35 of the rotor head. The wand 40 is formed with an upper cylindrical section 43 which terminates at a shoulder 44. A spherical rocker bearing 45 is fitted on the section 43 against the shoulder 44 and is held in place by a lock collar 46. The spherical rocker bearing 45 is mounted in a tubular sleeve 47 which is tightly fitted into a cylindrical bore 48 in the body 20, below the cavity 33. An inward shoulder 49 at the bottom of the sleeve 47 holds the bearing 45 in place.

A short portion of the wand 40 below the bearing 45 is enlarged to form a cylindrical head 50 to provide sockets to receive electrical connector wires as hereinafter described. The wand 40 below the head 50 is reduced in diameter and forms an elongated extension 51. The lower end of the wand, which extends below the body 20, is threaded to connect with a wire guide contact tip 52. This contact tip is a short cylindrical member of a selected metal such as copper and has a passageway 53 through it which is only a few thousandths of an inch larger than the diameter of the wire W so that electrical contact can be made with the electrode wire as it moves through the tip 52. It is to be noted that in this improved torch the only adjustment needed for a different sized electrode wire is to change this tip 52. Arcing as during a welding operation will occur at the end of the electrode wire W extended a short distance below this tip.

The tubular body 20 terminates a short distance below the cylindrical head 50 where it is closed by a circular end 54 which is held in place by screws 55. A gas shield tube 56 depends from the end 54 to enclose the lower wand extension 51 projecting below the body 20. The tube 56 carries a shielding cap 57, which extends downwardly to enclose the contact tip 52 and a portion of the electrode wire W projecting from the tip 52. This shielding cap 57 is slidable on the tube 56 for adjustments of position with respect to the length of the projected electrode wire W.

It is to be noted that the gas shield tube 56 insulated from the body 20 and the end 54 and the connection of the tube 56 to the end 54 is by an insulator ring 58 about the tube 56, and in a centered hole 59 in the end 54. This prevent an electrical short if the shielding cap is accidentally grounded as by touching a plate member M.

The electrical current for the welding operation is through the conduit jack 25, thence through the torch body 20 and to the sleeve 47. Flexible connector wires 60 are mounted in spaced sockets 61 at the lower edge of the sleeve 47 and in corresponding spaced sockets 62 on the head 50 of the wand 40 to thus direct the electrical current to the wand, thence to the tip 52 and thence to the electrode wire W. Lock screws 63 in the sleeve 47 and in the head 50, in suitable threaded holes, hold the ends of the connector wires in place.

Figure 6:
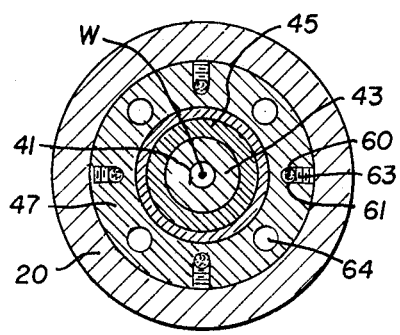
FIG. 6 is a transverse sectional view as taken from the indicated line 6—6 at FIG. 3.
Figure 7:
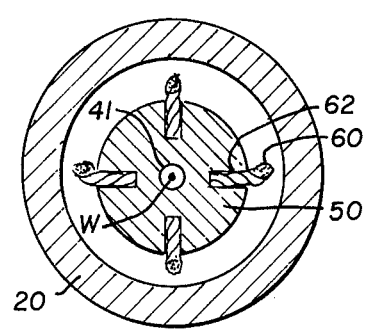
FIG. 7 is a transverse sectional view as taken from the indicated line 7—7 at FIG. 3.
Figure 3:
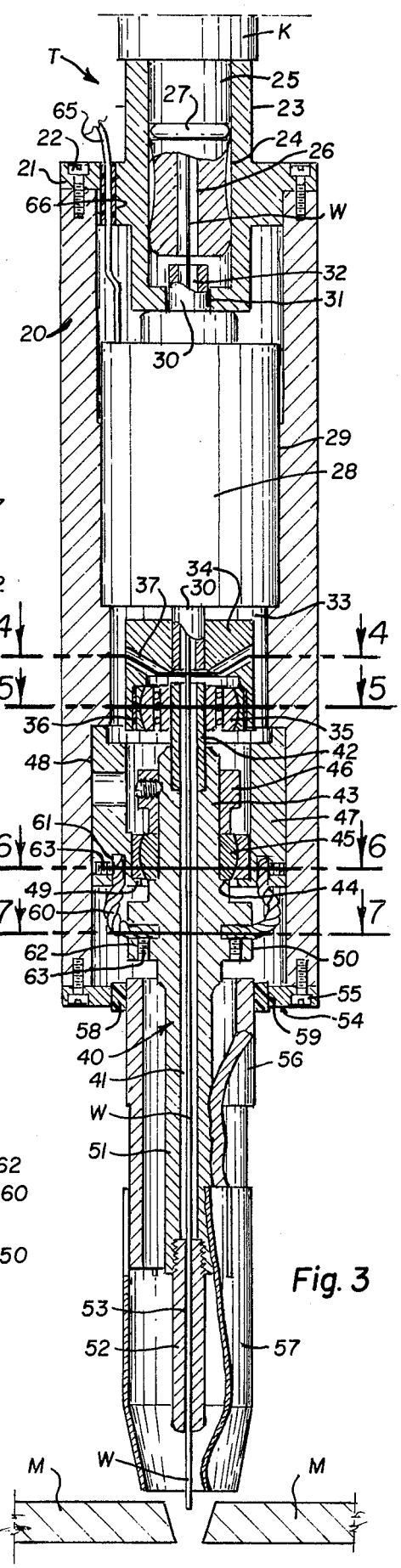
FIG. 3 is a sectional elevational view of the torch per se as taken from the indicated line 3—3 at FIG. 1 but on a further enlarged scale.

To complete this organization, an array of longitudinal passages 64 extend through the sleeve 47, as best shown at FIG. 6, to permit an easy flow of shielding gas from the cavity 33 and to the lower portion of the torch. Also, a lead 65 extends from the motor 28 as through an opening 66 in the end 21 and to the variable speed control V. It is to be noted that the variable speed control V' in the manual torch T' is in the handle H and includes a control trigger 67 at the handle.

The spherical rocker bearing 45 constitutes the fulcrum for the circular movement of the wand 40. This movement is generated by rotation of the motor 28 and the rotor head 34 connected to the motor shaft. The upper end of the wand, at the tip 42, moves in the circular path created by the eccentric spherical bearing 35 in the rotor head. A corresponding circular movement occurs at the lower arc end of the wand. The diameter of movement at the arc end of the wand is proportioned to the diameter of the circular movement of the eccentric bearing 35 as the distance from the rocker bearing 45 to the arc end of the wand is to the distance fromm the rocker bearing 45 to the spherical bearing 35, as in the manner best illustrated at FIG. 8. The actual diameter of the circular movement at the arc end of the wand will be slightly more than ⅛ inch when the root, or bottom, of the weld slot 70 between two plates M is ⅛ inch. The path diameter may be in the order of 0.03 inch more than the slot width. The path diameter of the electrode movement may be increased slightly by the flexing of that short portion of the electrode wire W projecting below the contact tip 52 due to centrifugal force when the wand rotates rapidly.

The variable speed control V, or V', will establish the rate of rotation of the wand 50. FIGS. 9 to 15 illustrate the character of welds possible with the improved torch and FIG. 16 indicates appropriate rotation rates, as hereinafter set forth. FIGS. 8 to 11 depict a common type of weld which is in a slot 70 between two plates M of the same thickness. The walls 71 and 72 of the plates M are sloped, as is the common practice, to provide a tapered slot and narrow root gap at the bottom of the slot. This gap is ordinarily ⅛ inch but it may vary as much as 1/16 inch in field welds without significantly affecting the weld.

FIG. 9 shows the manner in which a rotating electrode wire W forms a puddle 73 of weld metal in the slot 70. Arrows 'w' indicate a counterclockwise circular path of the electrode wire W. As heretofore mentioned, at suitable rotation rates, no metal is thrown from the electrode wire, as by centrifugal force, during that portion of electrode travel across the slot ahead of the puddle but an excess of metal is deposited against the wall 71 which the electrode then approaches. Likewise, it appears that more metal is deposited against the opposite wall 72 than in the puddle itself. The excess of metal deposited on the wall 71 can be deposited on the opposite wall 72 by simply reversing the direction of rotation of the wand 40.

The deposition of an excess of metal against the wall 71 is not objectionable in a welding operation. The deposit of more metal against the walls 71 and 72 than in the puddle 73 produces an excellent root weld 74 as shown at FIG. 10. The weld will be at the bottom of the slot 70, a condition referred to as "penetration" by the industry. More important, the surface will be concave as shown, which is the opposite to the convex weld bead commonly observed in conventional welds. It is to be also noted that a root pass can be formed without the need for backup members under the slot as is commonly necessary in conventional operations.

Once a root pass 74 is formed one or more fill passes will complete the weld, as indicated at 75 at FIG. 11. In filling the slot, a puddle of molten metal at the arc is sufficient to prevent the deposit of excess metal on the wall 71 from creating any problem. If desired, however, the direction of rotation may be reversed for one pass to balance the metal deposit. It is to be noted that the rate of deposition of metal may be significantly increased with the rotating electrode as by increasing the current and the electrode wire feed rate. In some instances the weld rate is twice as fast as that possible with conventional welding apparatus. Apparently this occurs because the electric arc is continuous and not intermittent.

FIGS. 12 to 15 show welding applications where the rotating electrode has proven to be especially useful. FIG. 12 shows a weld 75' where a plate M and a thinner plate M' are joined together. The rotating electrode can be easily adjusted such that a substantial portion of the metal will be deposited on the wall 71 of the thicker plate M and a lesser portion on the wall 72' of the thinner plate M'. This selective deposit of metal solves the common problem of joining thicker and thinner plates without overheating the thinner plate.

FIG. 13 illustrates a partially completed weld 75 between plates M which are placed in a vertical plane with the weld slot 70 being horizontal. The rotating electrode can be set to throw an excess of metal against the under wall 71 of the upper plate M to counter the effect of gravity tending to flow the molten metal to the lower slot wall 72.

FIG. 14 shows a structural angle 76 welded against a thinner sheet 77, exemplary of a lap weld. The rotating electrode wire W can be positioned to direct a substantially greater portion of the molten metal and heat against the edge of the thicker structural angle and thus avoid overheating and burning through the thinner sheet 77.

FIG. 15 shows a root pass 74' having poor penetration, that is, with the weld bridging the slot 70 above its bottom. Poor penetration, ordinarily undesirable, is needed for some special applications. One example is the seal weld of a nuclear fuel element. The rotating electrode can provide for a good seal weld, with poor penetration, by simply increasing the rate of rotation above that which can normally be used.

FIG. 16 is a graph to show the relationship between the diameter of the electrode wire W and the rate of rotation of the electrode wire. The maximum suitable rotation rate of the electrode, curve 'A', was established as the maximum at which a root pass with good penetration was possible. A rotation rate in excess of this maximum will result in small droplets of molten metal being thrown from the electrode in all directions with poor penetration and sometimes poor coalescence. The minimum suitable rotation rate of the electrode curve, 'B', was established as that where the improved welding action ceased as the rate of rotation was decreased. With the electrode wire rotating above this minimum, the arc is continuous as indicated by an absence of the sputtering sound commonly observed in arc welding. With the electrode wire rotating below this minimum, sputtering commerces. Another effect occurs as the speed of rotation decreases. If the amperage and wire feed had been increased to take advantage of the greater welding capacity of the rotating electrode at the higher rates of rotation, the slow-down would have caused a blow-through by the arc or other breakdown of the welding action, the same as in conventional welding when too great an amperage and wire feed is used.

Curves 'A' and 'B' of FIG. 16 are exemplary of a torch wherein the electrode wire rotates about a ⅛ inch diameter path and the welding action is with steel plates and a steel electrode wire. The maximum rotation rates, curve 'A', vary from 5,000 to 11,100 R.P.M. for the wire diameters tested. The corresponding minimum rotation rates, curve 'B', vary from 2,500 to 5,300 R.P.M. These wires tested, having diameters of 0.035, 0.045 and 0.062 inch, are common for commercial welding operations, and the limits shown at FIG. 16 constitute examples of the process using rotation of the electrode. 1,000 R.P.M. could be considered a minimum rotation for any condition. Changing the proportions of the torch and the diameter of the electrode wire path will change these critical rotation rates. Also, the rotation rates will change with different metals; for example, when welding with stainless steel the critical rotation rates will differ since the viscosity and surface tension of that molten metal are different from ferric metal. Also, variations can occur when different types of shielding gases or fluxes are used.

It is not necessary, however, to provide information such as that depicted by curves 'A' and 'B' for all combinations of metals, alloys and the shielding materials since a skilled operator can make a few simple tests and adjustments to the rotation rate of the electrode wire, along with settings of current and wire feed before commencing a welding operation as in the manner heretofore explained. Once the adjustments and settings are made, good welds are possible even with variations of the various factors to be considered. For example, the curves at FIG. 16 indicate satisfactory performance through a substantial range of rotation rate.

I have now described my invention in considerable detail. It is obvious, however, that others can build and devise alternate and equivalent constructions and operations which are within the spirit and scope of my invention. Hence, I desire that my protection be limited, not by the constructions and operations illustrated and described, but only by the proper scope of the appended claims.

I claim:

1. In a torch for continuous arc welding which includes a body through which an electrode wire moves, into the head end of the body and from the base end thereof, and means to produce a wire consuming electric arc as the wire moves from the base end of the body, the improvement comprising:
(a) an elongated wand within the body having a head end within the body and a base end at the base end of the body, an axial passageway from the head end to the base end through which the electrode wire moves, and a tip at the base end with the arcing end of the wire being extended therefrom; and
(b) a rotation means adapted to move the wand and the arcing end of the wire in a circular path and including a motor within the body adjacent to the head end of the body and having a tubular shaft in substantial alignment with the wand, with the electrode wire being extended through the motor shaft and into the wand passageway, a rotor head having an eccentric mount means is mounted on the motor shaft and the head end of the wand is carried in the eccentric mount means to move in a circular path as the motor shaft rotates the rotor head, and the diameters of the passageways through the motor shaft and wand, with respect to the eccentricity of the mount means, are sufficient to permit movement of the electrode wire from the motor shaft and into the wand.

2. The torch defined in claim 1, including a variable speed control to vary the speed of the motor.

3. The torch defined in claim 1, wherein:
(a) a spherical rocker bearing is mounted in the body and carries the wand at a selected position between the head end and the tip end of the wand such that a movement at the head end of the wand is accompanied by an opposite movement at the tip of the wand, whereby the circular movement of the head end of the wand produces a corresponding out-of-phase circular movement at the tip of the wand; and, (b) the eccentric mount means on the rotor head includes a spherical bearing to permit tipping of the wand as it rotates.

4. The torch defined in claim 3, wherein a passageway for a shielding gas extends through the torch and the base end of the body is a gas shield tube, with the wand extending from the rocker bearing and into the tube.

5. The torch defined in claim 4, including an electrical circuit for the arc, which extends through the head and thence through the wand, and means insulating the gas shield tube from the wand and body.

6. The torch defined in claim 5, including a flexible wire connection between the body and the wand, and wherein the eccentric mount means on the rotor head includes a bearing means to permit rotation of the rotor head without rotation of the wand.

7. In a torch for continuous arc welding which includes a body through which an electrode wire moves, into the head end of the body and from the base end thereof, and means to produce a wire-consuming electric arc as the wire moves from the base end of the body, the improvement comprising:

(a) an elongated wand within the body having a head end within the body and a base end at the base end of the body, and an axial passageway from the head end to the base end through which the electrode wire moves with the arcing end of the wire being extended from the base end thereof; and, (b) a rotation means adapted to move the wand and the arcing end of the wire in a circular path and including a rotatable shaft means having a passageway in substantial alignment with the wand passageway, with the electrode wire being extended through the shaft means passageway and into the wand passageway, a rotor head having an eccentric mount means is mounted on the shaft means and the head end of the wand is carried in the eccentric mount means to move in a circular path as the shaft means rotates the rotor head, and the diameters of the passageways through the shaft means and wand are sufficient to permit movement of the electrode wire from the shaft means and into the wand.

* * * * *